United States Patent
Burns

[15] 3,696,385
[45] Oct. 3, 1972

[54] INDICATOR

[72] Inventor: Harold S. Burns, 38 Greengate Road, Falmouth, Mass. 02540

[22] Filed: Nov. 3, 1970

[21] Appl. No.: 86,419

[52] U.S. Cl. ............................. 340/316, 340/27 NA
[51] Int. Cl. ................................................. G09f 9/00
[58] Field of Search ...340/212, 27 R, 27 NA, 27 AT, 340/316, 317, 324 A

[56] References Cited

UNITED STATES PATENTS 3,114,089  12/1963  Mulligan .................... 340/187
3,350,705  10/1967  Bendicsen ................. 340/212
3,525,091   8/1970  Lally .......................... 340/324
2,537,086  10/1970  Andresen ................. 340/27 R Primary Examiner—Thomas B. Habecker
Attorney—Barlow & Barlow

[57] ABSTRACT

A composite indicator for obtaining a digital or alpha numeric readout as well as a dial type readout with provision for adjusting the output by dialing in certain corrections.

2 Claims, 3 Drawing Figures

INVENTOR
HAROLD S. BURNS

INDICATOR

BACKGROUND OF THE INVENTION

This invention basically relates to a display apparatus or indicator of composite type for a system in which direction, heading or bearing are involved and provides not only digital or alpha numeric readout but dial readout. Considering the application in a compass system, it has been very common in the past aboard ships to utilize either magnetic compass cards or gyro energized compass cards for steering information that is displayed to the helmsman. As a result the helmsman has become quite accustomed to watching the compass card or dial rotate in response to changes in direction of the ship's head. A conventional dial used in this system is graduated in at least one degree graduations over a 360° circle and is marked numerically in at least ten degree spaces. This means that the person visualizing this type of information mentally has to compute the actual reading in his mind, that is, to whether the graduation that he is looking at is 2°, 24° or what have you since the graduations in between the prime numerically marked graduations are not indicated. It would be helpful, therefore, to have an immediate translation of the reading that is being seen by the user so that immediate interpretation can be had. In the past a number of devices have been used to aid one viewing a dial such as a compass dial and these have taken the form of primarily a manually adjusted set of lines into which a pointer should be placed to steer the correct course should the device be located on a moving vehicle. Some aircraft repeaters utilize this principle. Additionally magnifying devices aid a viewer and are in common use.

Many other applications of the indicator suggest themselves since the only limitation is the parameter that is sensed. Broadly, therefore, the indicator may provide information such as liquid level in a tank, temperature, salinity, cable length, and a variety of angular information readouts.

SUMMARY OF THE INVENTION

A display apparatus is provided which obtains a dial readout as well as a digital or alpha-numeric readout. The dial readout and the character/numeral readout are located in close proximity to each other so that if one is looking directly at one readout, by a very slight angular shift of a person's eye, he can direct his attention to the secondary readout device. Also in certain types of display apparatus it is advantageous to limit the field of view of any particular source of information and to this end the present display apparatus limits the field of view of the dial indicator preferably to approximately a third of a circle so that only a partial segment of the circle is being viewed at any one time and the visual perception that must be obtained by the person looking at the information is much easier therefore to abstract.

DESCRIPTION OF THE PREFERRED EMBODIMENT

Figure 1:
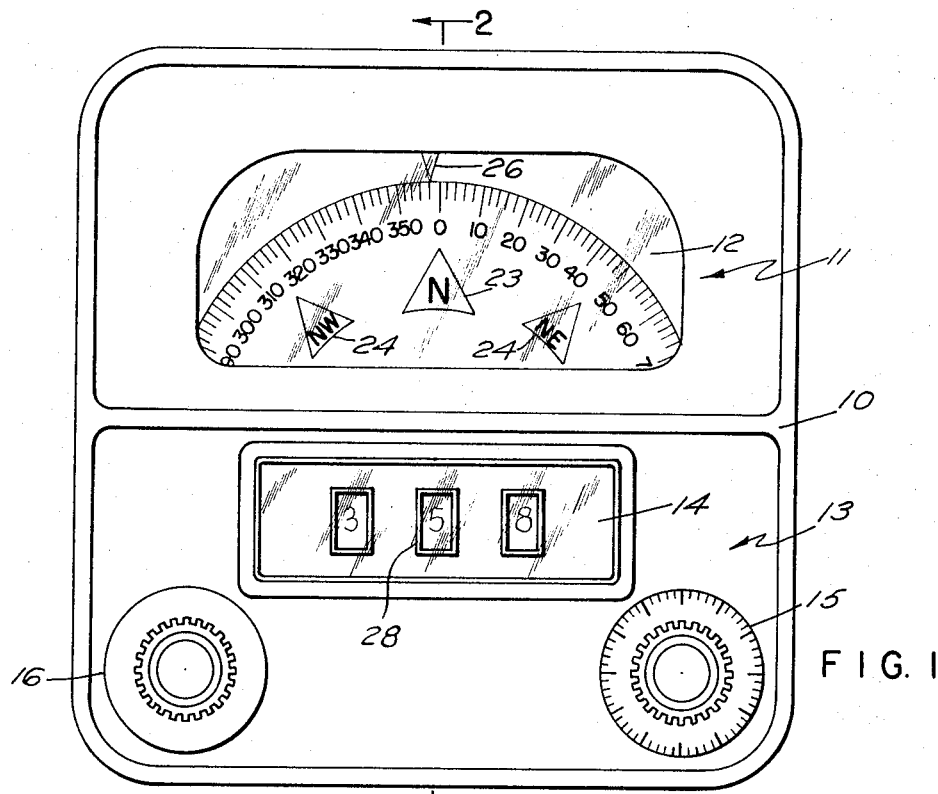
FIG. 1 is a elevational view of the face of the display apparatus of the invention in the preferred form thereof.

It will be seen that the indicator of this invention is basically contained in a case 10 which may be centrally divided into two sections, there being an upper section 11 with a viewing window 12 and a lower section 13 with a viewing window 14. Also located within the lower section 13 may be accessory devices in the form of knobs to provide a plurality of desired functions. If the device is utilized as a directional indicator for a compass system, then, for example, a graduated dial 15 may be provided as a variation correction device and a second dial and knob 16 may be provided to control the amount of illumination provided to the readout system.

Figure 2:
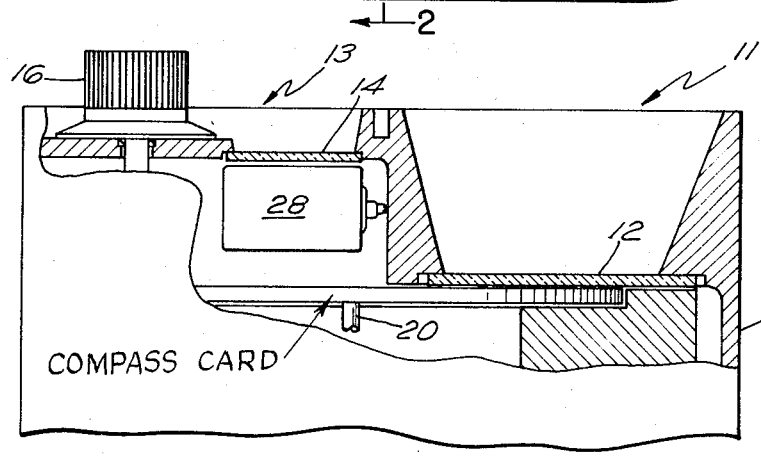
FIG. 2 is a sectional view taken on lines 2—2 of FIG. 1.

Within the housing and mounted on a shaft 20 is a graduated dial 22, which if used as a compass card or directional indicator is graduated in degrees of a circle from 0 to 360 and which may be provided with cardinal points 23 and intercardinal points 24 to aid the user in recognizing the information displayed. It will be seen particularly by referring to FIG. 2 that only a portion of the dial 22 is being displayed through the viewing port 12. This arrangement permits the user to view only that section of information which is usable to him and which is readable by the index pointer 26. Located within the lower part 13 of the housing are a plurality of alpha numeric or digital displays 28 which are mounted in a fashion to be seen through the viewing port 14. The arrangement of the displays 28 is such that they are located effectively over the unused portion of the dial 22 thus making the two viewing ports in close proximity to each other which aids the viewer in watching two displays with very little eye shift.

Figure 3:
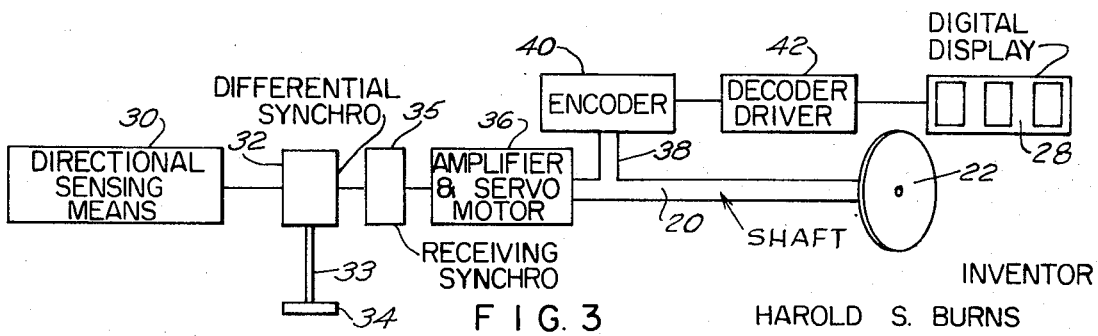
FIG. 3 is a block schematic diagram showing matter in which the two readout devices may operate.

The apparatus may be suitably powered by a sensing means shown in FIG. 3 as a block 30, which measures a varying parameter such as a directional heading. From this particular sensing means a differential synchro 32 may be placed having a shaft 33 protruding therefrom to a knob 34 to change the angular information that is presented to its input. The output of the differential synchro is fed to a control transformer or receiving synchro 35. The output thereof is suitably amplified and drives a servo motor (indicated by block 36) and the rotative output drives shaft 20 which then may be directly coupled to the dial 22 and intermediately coupled through a shaft 38 to an encoder 40. The encoder is essentially an analog to digital converter to change the shaft angle of the shaft 37 to digital logic. The encoder can take a variety of forms, one form being a housing having a plurality of individual segments which are contacted by a brush driven by the shaft 38. In this fashion the brushes perform a switching operation when the shaft rotates onto a different segment, there being a sufficient number of segments to provide discreet switch positions, and in this case 360 switch positions. Various combinations of segment switching in a plurality of switching paths can be made to produce the proper coding required as is well known to those skilled in the digital display art. Other types of encoders may be used as, for example, an optical encoder where alternate opaque and transparent spots replace the actual segments and brushes are replaced by photo-conductors. Following the encoder 40 is a decoder driver 42 whose purpose is to decode the encoded shaft angle to produce the proper sequence of currents to operate the displays. Again, a variety of decoder driver arrangements can be utilized; for example, a four-line BCD code and decoder driver will change the encoder information to drive properly the digital display devices 28 so that one will display in units, one device will display in tenths and the other in hundreds.

It is helpful if the encoder that is utilized has an unambiguous output and produces a readout that corresponds to a given angle, and if the shaft is turned, the readout holds the last reading until it has turned more than one half of the space between degrees and then switches to the next full degree. In this way with an unambiguous output it never becomes hung up between two numbers and read either the wrong nothing or some meaningless number.

Through the combination of the digital display and the dial display, the heading of a vehicle as, for example, a ship can be observed as a conventional compass card dial and a digital display.

I claim:

1. An indicator display for a compass system comprising a case, said case having one wall with a pair of juxtaposed openings with transparent means forming viewing windows, a graduated dial having peripheral scale divisions, said dial mounted on a shaft to rotate therewith, the axis of said shaft located to one side of an edge of and behind one opening to display a sector only of said dial, a digital readout means located behind the other viewing window.

2. A composite indicator display apparatus for a compass system comprising a disc compass card having circumferential scale divisions adjacent its periphery, said card being mounted on a shaft, a case, said case enclosing said card and shaft, said case having one wall provided with a pair of openings adjacent, digital readout means mounted adjacent the central portion of the disc compass card and viewable through one of said openings, a segmental portion of the disc compass card being viewable through the other opening, an edge of said other opening being located above the axis of said shaft and means rotating said card and actuating said digital readout whereby duplicate readings may be obtained by the card and readout respectively.

* * * * *